Figure 1:
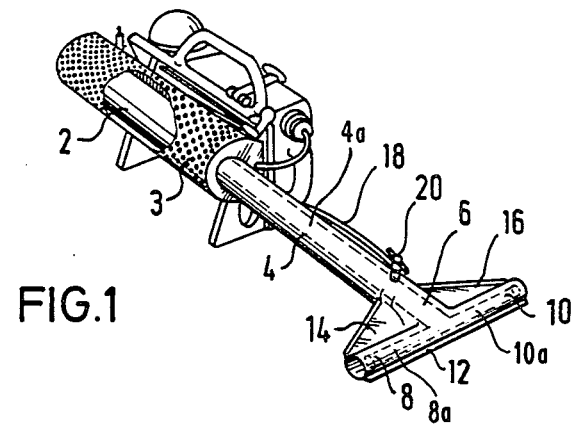

United States Patent [19]

Stahl et al.

[11] 4,298,167
[45] Nov. 3, 1981

[54] MIST GENERATOR

[75] Inventors: Karl-Heinz Stahl, Zum Felchen 20, D-7770 Überlingen, Nussdorf, Fed. Rep. of Germany; Fritz Fend, Regensburg; Werner Stahl, Überlingen, both of Fed. Rep. of Germany

[73] Assignee: Karl-Heinz Stahl, Überlingen, Nussdorf, Fed. Rep. of Germany

[21] Appl. No.: 60,778

[22] Filed: Jul. 26, 1979

[30] Foreign Application Priority Data

Aug. 11, 1978 [DE] Fed. Rep. of Germany ....... 2835338

[51] Int. Cl.³ ............................................. A01M 7/00
[52] U.S. Cl. ................... 239/129; 43/132 A; 47/1.7; 239/565
[58] Field of Search ............................ 43/124–132 A; 252/359 CG; 60/39.77; 47/1.5, 1.7; 239/77, 129, 565, 102

[56] References Cited

U.S. PATENT DOCUMENTS

| 559,042 | 4/1896 | Potter | 43/132 R X |
| 2,959,214 | 11/1960 | Durr et al. | 239/129 X |
| 3,184,888 | 5/1965 | Fruth et al. | 47/1.5 |
| 3,855,148 | 12/1974 | Locher et al. | 252/359 CG X |

FOREIGN PATENT DOCUMENTS 673481 6/1952 United Kingdom ................. 43/125

Primary Examiner—Andres Kashnikow

[57] ABSTRACT

A mist generator particularly for spraying pesticides on plants includes at least two exhaust nozzles from which generated mist is emitted from the mist generator, the nozzles being jointly fed by a common pulsating combustion chamber and extending in generally opposite directions.

7 Claims, 3 Drawing Figures

MIST GENERATOR

BACKGROUND OF THE INVENTION

The present invention relates generally to mist generators and particularly to devices which operate to spray pesticides for controlling plant diseases particularly useful in connection with cotton, rice and coffee plants. The mist generator of the invention is of the type wherein a pulsating combustion chamber is utilized.

Mist generators of the type herein mentioned which are previously known have a resonator or tube which is fed in the pulsating combustion chamber with a single exhaust nozzle.

The present invention is aimed toward providing expansion of the range of area which can be sprayed with the mist developed by means of such a mist generator.

SUMMARY OF THE INVENTION

The mist generator of the present invention is particularly characterized in that it is provided with at least two exhaust nozzles which are jointly fed by a common pulsating combustion chamber.

Thus, in accordance with the invention, more than a single exhaust nozzle may be provided and as a result the range of spraying of the device is expanded.

If two rows of plants which extend in a spaced juxtaposition next to each other are to be simultaneously sprayed with a pesticide mist, preferably two exhaust nozzles will be attached to the end of a resonator tube which is fed by the pulsating combustion chamber, the two nozzles pointing in opposite directions and being arranged to extend approximately at right angles relative to the longitudinal direction of the resonator tube.

If a wider range is to be uniformly sprayed with pesticide mist, then preferably two exhaust nozzles are attached to the end of a resonator tube which is fed by the pulsating combustion chamber, the nozzles being arranged at an acute angle relative to the longitudinal axis of the resonator tube.

In order to spray plant leaves with mist preferably from below or from above, the plane which contains the longitudinal axes of the exhaust nozzles may be arranged preferably to intersect the longitudinal axis of the resonator tube at an acute angle. As a result, depending upon whether it extends obliquely downwardly or obliquely upwardly, a preferred mist spray of the top sides of the leaves or of the bottom sides of the leaves may be applied. In order to adjust the mist spray especially advantageously relative to the prevailing conditions, each of the exhaust nozzles is preferably provided with a separate dosing device. These dosing devices are preferably interchangeable and the exhaust nozzles are also preferably releasably connected to the resonator tube in order to enable exchange and replacement thereof and cleaning of the resonator tube.

The resonator tube and the exhaust nozzles are cooled when they are arranged within a diffuser tube with end pieces producing a Venturi effect.

In order to simplify exchange of the exhaust nozzles, there is preferably arranged a releasable distribution piece between the resonator tube and the exhaust nozzles.

In order to prevent plants which are being sprayed from adhering to the outer sides of the hot exhaust nozzles of the mist generator, plant deflector bars which project from the end pieces of the device are preferably arranged on the outer sides of the end pieces of the diffuser tube. For the same reason, the plant deflector bars are also preferably arranged at the end of the diffuser tube itself.

A mist generator in accordance with the invention is preferably provided with an automatic cut-off device which is known per se. This cut-off device will stop the discharge of mist when the generator ceases for any reason to operate, for example due to lack of fuel. As a result, the danger of ignition of the mist is suppressed and overdosing is avoided. A blowoff cock is also preferably provided which operates to produce an effect in that the generator, when it is stopped, will blow out residual amounts of oil so that not fire can be developed by oil which is continued to be supplied and which may be ignited at hot surfaces of the generator and which may draw in atmospheric oxygen through the exhaust nozzles. This is of special importance since, after the generator has been stopped, the direction of cooling is reversed. The pulsating combustion chamber produces a chimney effect on the exhaust nozzles whereby atmospheric oxygen may be drawn into the pulsating combustion chamber. As a result, there exists the danger that residual amounts of oil or some other combustible carrier material may be ignited. This is avoided when a blow-off cock is provided and it will be apparent that this measure is particularly important when oil is used as the carrier material for the mist.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 1 is a perspective view showing a first embodiment of a mist generator in accordance with the present invention;

FIG. 2 is a perspective view partially broken away showing a second embodiment of a mist generator in accordance with the invention; and FIG. 3 is a perspective view showing the exhaust region of the mist generator according to FIG. 2 in the disassembled state.

DETAILED DESCRIPTION OF PREFERRED EMBODIMENTS

A first embodiment of the invention is shown in FIG. 1 which depicts a mist generator having a pulsating combustion chamber 2 which is surrounded by a perforated protective housing 3 and from which a resonator tube 4*a* extends, the resonator tube 4*a* being arranged in a diffuser tube 4. The diffuser tube 4 is formed by a metal jacket which, during the time that the mist generator is in operation, draws in cooling air by means of a Venturi effect. The end of the diffuser tube 4 is branched or forked and encloses therein a distribution piece 6 which divides the end of the device into two exhaust nozzles 8*a* and 10*a* enclosed within end pieces 8 and 10.

The end pieces 8 and 10 point in opposite directions an their axes extend perpendicularly relative to the axis of the diffuser tube 4. The diffuser tube 4 and the end pieces 8 and 10 surround the distribution piece 6 and the exhaust nozzles 8a, 10a which are releasably attached to the end of the resonator tube 4a from which the two exhaust nozzles 8a, 10a extend concentrically in the end pieces 8,10 with their ends terminating short of the ends of the end pieces 8, 10.

At the outer side of the end pieces 8,10 there are mounted forwardly pointing plant deflector bars 12. Corresponding bars 14 and 16 are also arranged on the rear sides of the end pieces 8 and 10 in order to extend to between portions of the diffuser tube 4 and the end pieces 8a, 10a which surround the distribution piece 6 so that they additionally serve as reinforcements. The liquid for generating the spraying mist is supplied throught a line 18 and is conveyed through the exhaust nozzles and through an adjustable and/or exchangeable valve 20 or an appropriate dosing nozzle.

Figure 2:
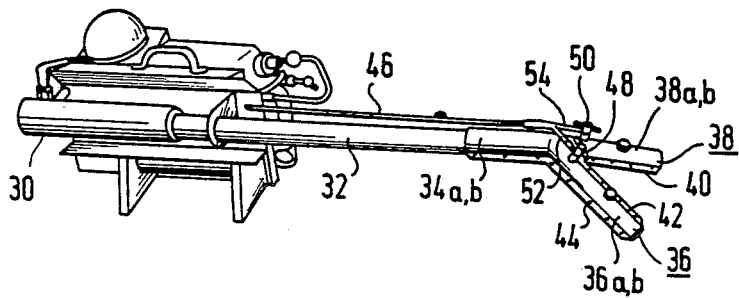
Figure 3:
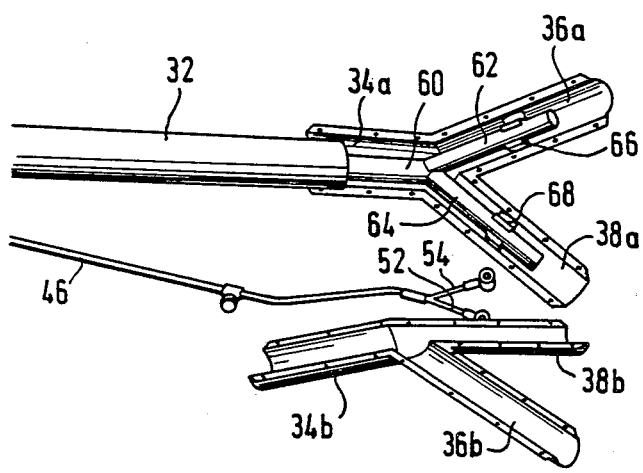

In the embodiment depicted in FIGS. 2 and 3, a pulsating combustion chamber 30 is again provided with a resonator tube which is surrounded by a diffuser tube 32. Attached to the free end of the diffuser tube 32 there are provided diffuser tube end members 34a, 34b, each having two end pieces 36a, 36b, 38a, 38 b which while being arranged symmetrically relative to the longitudinal axis of the diffuser tube 32 form an angle of about 60°. The plane in which the longitudinal axes of the end pieces 36a, 36b, 38a, 38b are located forms an acute angle with the axis of the diffuser tube 32 so that the end pieces 36, 38 are directed obliquely downwardly.

Plant deflector bars 40,42 and 44 are attached to the inner sides and the outer sides of the end pieces 36a, 36b, 38a, 38b and the end members 34a, 34b. The end members 34a, 34b as well as the end pieces 36a, 36b, 38a, 38b are formed in halves by combined shells which include the members 34a, 36a, 38a and the members 34b, 36b and 38b, each of the shells being adapted to be joined together. The end pieces 36a, 36b, 38a, 38b and end members 34a, 34b surround a distribution piece 60 which is releasably attached to the end of the resonator tube from which there extend two exhaust nozzles 62,64 which extend concentrically in the end pieces 36a, 36b, 38a, 38b and open out in front of the end pieces 36a, 36b,- 38a, 38b. Spacer clamps 66,68 serve for concentric support of the exhaust nozzles 62,64 in the end pieces 36a, 36b, 38a, 38b.

Liquid for generating the spraying mist is supplied through a line 46 separately to the two exhaust nozzles 62,64 and through separately adjustable valves 48,50. For this reason, the line 46 is divided into two branches 52 and 54 in front of the two valves 48,50.

While specific embodiments of the invention have been shown and described in detail to illustrate the application of the inventive principles, it will be understood that the invention may be embodied otherwise without departing from such principles.

What is claimed is:

1. A mist generator particularly for spraying pesticides on plants comprising: a pulsating combustion chamber; a resonator tube connected with said pulsating combustion chamber; a distribution tube releasably connected with said resonator tube; at least two exhaust nozzles attached with said distribution tube; and a diffuser tube having branched ends pieces; with said resonator tube, said distribution tube and said exhaust nozzles being concentrically enclosed within said diffuser tube.

2. A mist generator according to claim 1 wherein said exhaust nozzles are arranged to extend in oppositely pointing directions.

3. A mist generator according to claim 1 wherein said resonator tube includes a longitudial axis and wherein said exhaust nozzles are arranged to extend at acute angles relative to said longitudinal axis.

4. A mist generator according to claim 3 wherein said exhaust nozzles include longitudinal axes which extend in a plane which intersects the longitudinal axis of said resonator tube at an acute angle.

5. A mist generator according to claim 1 further comprising a separate dosing device provided for each of said at least two exhaust nozzles.

6. A mist generator according to claim 1 wherein said branched end pieces of said diffuser tube are provided with outwardly projecting plant deflector bars on the outer sides thereof.

7. A mist generator according to claim 6 wherein the end of said diffuser tube adjacent said branched end pieces thereof is provided with outwardly projecting plant deflector bars.

* * * * *